W. A. SHIMP.
VALVE.
APPLICATION FILED OCT. 6, 1919.
1,354,582. Patented Oct. 5, 1920.
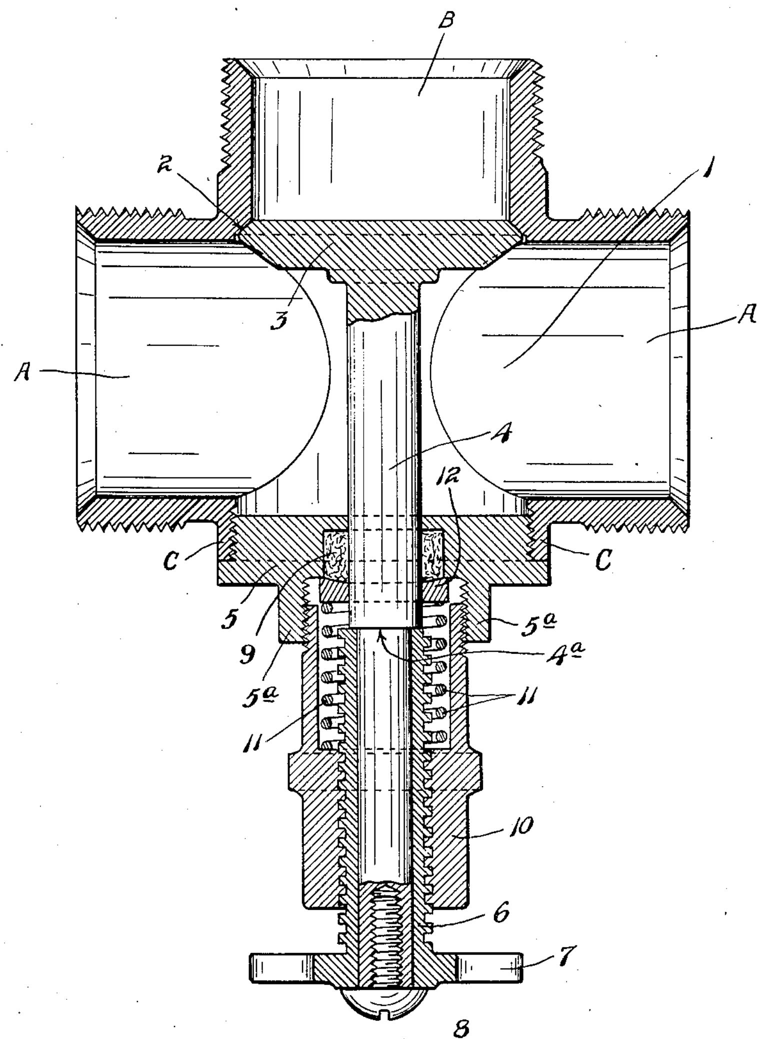
INVENTOR.
WILLIAM A. SHIMP.
BY HIS ATTORNEYS.
Williamson & Merchant

UNITED STATES PATENT OFFICE.

WILLIAM A. SHIMP, OF MINNEAPOLIS, MINNESOTA.

VALVE.

1,354,582. Specification of Letters Patent. Patented Oct. 5, 1920.

Application filed October 6, 1919. Serial No. 328,716.

*To all whom it may concern:*

Be it known that I, WILLIAM A. SHIMP, a citizen of the United States, residing at Minneapolis, in the county of Hennepin and State of Minnesota, have invented certain new and useful Improvements in Valves; and I do hereby declare the following to be a full, clear, and exact description of the invention, such as will enable others skilled in the art to which it appertains to make and use the same.

My invention has for its object to provide an improved valve adapted for many uses, but particularly adapted for use in couplings between the trunk lines and certain vats or other devices constituting parts of systems for handling milk and cream, such as employed in creameries, for example. Coupling and valve mechanism of this character should not only be capable of being readily cleaned, but be of such nature that there will be little chance for lodgment of deposits. The valve, when closed, should not obstruct the free passage through the trunk line, and moreover, it is important that the valve be capable of movement to and from its seated position without causing a rotation of the valve, such as would tend to destroy or rapidly wear the coöperating faces of the valve and valve seat.

The above object I accomplish in my improved valve mechanism which is illustrated in the single view of drawing.

The valve mechanism shown includes a valve casing that is in the form of a T-coupling indicated as an entirety by the numeral 1 and having three large externally threaded nipples or neck portions A—A and B, the nipples A—A being axially alined and adapted to constitute part of the main or trunk line. The nipple B, at its junction with the main line is formed with a conical valve seat 2 that fits the conical valve surface of a valve 3 having an extended stem 4. The valve stem 4 extends axially outward through a removable head 5 that has screw-threaded engagement with a short internally threaded nipple C that is located opposite to the nipple B in axial alinement therewith. Outward or beyond the head 5, the valve stem 4 is reduced to afford a thrust shoulder $4^a$, and rotatably mounted on this reduced outer portion of said stem is externally threaded stem sleeve 6. The sleeve 6 is provided at its outer end with a head 7, by means of which it may be readily rotated and the said sleeve is free to rotate on the reduced portion of said stem but is held against axial movement in respect thereto, or, in other words, is held for common axial movement with the said valve stem and valve 3, by a shoulder $4^a$ and by the head of a screw 8 that is screwed into the reduced outer end of said valve stem. Head 5 is provided with an internal cavity for the reception of a pliable gasket 9 that directly engages the valve stem. Head 5 is provided with an internally threaded hub $5^a$, the interior of which is of larger diameter than the exterior of packing 9, and a tubular housing 10, at its inner end has external threads that are screwed into the said hub. This housing 10 surrounds the stem sleeve 6, and the latter has screw-threaded engagement therewith. Preferably, the threaded engagement between sleeve 6 and housing 10 is a coarse rectangular thread which provides for rapid movement of the valve to and from operative positions. Housing 10 includes a spring 11 that re-acts against the internal shoulder thereof and against a metallic washer 12 that is directly pressed by said spring against the packing 9, so as to make the same automatically compressed and to compensate for wear. The tension of the spring on the packing can be varied by screwing the housing 10 farther into or farther out of the hub $5^a$, according to whether pressure is desired on the packing. Obviously, the frictional engagement between the packing and the stem 4 will hold the valve stem, and hence, the valve against rotation unless very considerable rotary strain be applied thereto, which does not happen in this improved valve.

When stem sleeve 6 is rotated by movement of its head 7, it will be caused to travel axially and will carry the valve stem and valve with it, but without rotating said valve or valve stem, and thus the valve will be pressed to its seat or from its seat by direct axial movement and without rotation, so that there will be no frictional grinding action between the valve and valve seat.

When the valve is in its closed position indicated in the drawing, it will be at one side of the main conduit or trunk line, and when it is moved to its extreme open position against the head 5, it will be at the opposite side of said main conduit, so that both in its extreme open and closed positions, said valve will not obstruct the free flow through the main line. In practice, the nipple or sleeve B will be connected to a branch line or to some vat, or the like, which, in practice, must sometimes be connected to and sometimes disconnected from the main or trunk line.

It is further important to note that the passage through the internally threaded nipple C is large enough to permit the valve 5 to be adjusted therethrough, thereby affording easy means of applying and removing the valve. This feature also permits the valve mechanism to be readily cleaned. Obviously, the valve mechanism described, affords not only a valve mechanism proper, but constitutes a pipe coupling. In actual practice, this device has been found highly efficient and satisfactory for the purpose had in view.

What I claim is:

1. The combination with a valve casing having a valve seat at one side and a removable head at the opposite side, of a valve stem working through said head and provided with a valve for engagement with said valve seat, an externally threaded stem sleeve rotatably mounted on said valve stem but held for axial movements therewith, a housing anchored to said head, said sleeve having threaded engagement with said housing, a packing seated in said head and surrounding said stem, and a spring located within said housing and re-acting against the same and said packing.

2. The combination with a valve casing having a valve seat at one side and a removable head at the opposite side, of a valve stem working through said head and provided with a valve for engagement with said valve seat, an externally threaded stem sleeve rotatably mounted on said valve stem but held for axial movements therewith, a housing anchored to said head, said sleeve having threaded engagement with said housing, a packing seated in said head and surrounding said stem, and a spring located within said housing and re-acting against the same and said packing, the said housing having threaded engagement with said head in the adjustment of the tension of said spring.

3. The combination with a valve casing in the form of a T-coupling having axially alined nipples and a third nipple at a right angle thereto, said latter nipple having a valve seat at its inner portion, and said casing having an internally threaded nipple alined with and opposite to said valve seat, the passage through said internally threaded nipple being larger than said valve seat, a head having threaded engagement with said internally threaded nipple, a housing having threaded engagement with said head and axially alined therewith, a valve fitting said valve seat and having a stem extended axially outward through said head and housing and having a reduced outer portion, a packing seated in said head and engaging the body of said valve stem, a washer engaging said packing, a stem sleeve rotatably mounted on the reduced portion of said stem and having threaded engagement with said housing, a screw applied to the outer end of said valve stem and holding said stem sleeve between the head thereof and the shoulder of said stem, said stem sleeve having a head at its outer end, and a coiled spring within said housing re-acting against the same and said washer.

In testimony whereof I affix my signature.

WILLIAM A. SHIMP.